US012667108B2

(12) United States Patent
Verouden et al.

(10) Patent No.: US 12,667,108 B2
(45) Date of Patent: Jun. 30, 2026

(54) APPARATUS AND METHOD FOR THE FINAL PROOFING OF DOUGH

(71) Applicant: KAAK GROEP B.V., Terborg (NL)

(72) Inventors: Franciscus Quirinus Fredrik Verouden, Terborg (NL); Maria Kokkoti, Terborg (NL); Michel Martinus Willem Van Wezel, Terborg (NL)

(73) Assignee: KAAK GROEP B.V., Terborg (NL)

( * ) Notice: Subject to any disclaimer, the term of this patent is extended or adjusted under 35 U.S.C. 154(b) by 827 days.

(21) Appl. No.: 17/787,706

(22) PCT Filed: Dec. 21, 2020

(86) PCT No.: PCT/NL2020/050812
§ 371 (c)(1),
(2) Date: Jun. 21, 2022

(87) PCT Pub. No.: WO2021/125965
PCT Pub. Date: Jun. 24, 2021

(65) Prior Publication Data
US 2023/0019050 A1     Jan. 19, 2023

(30) Foreign Application Priority Data
Dec. 20, 2019     (NL) ...................................... 2024529

(51) Int. Cl.
A21D 8/02          (2006.01)
A21C 13/02         (2006.01)
(52) U.S. Cl.
CPC ................ A21D 8/02 (2013.01); A21C 13/02 (2013.01)

(58) Field of Classification Search
CPC .................................. A21D 8/02; A21C 13/02
USPC ........................................................... 426/19
See application file for complete search history.

(56) References Cited

U.S. PATENT DOCUMENTS 6,383,530 B1 *   5/2002   Iwashita ................ A21D 6/001
                                                              426/8
2008/0311263 A1   12/2008   Willett

FOREIGN PATENT DOCUMENTS

CN          104757041 A      7/2015
EP          0954973 A2      11/1999
FR          2996985 A1       4/2014
(Continued)

OTHER PUBLICATIONS

International Search Report from PCT Application No. PCT/NL2020/050812, Mar. 3, 2021.
(Continued)

*Primary Examiner* — Subbalakshmi Prakash
(74) *Attorney, Agent, or Firm* — Workman Nydegger

(57)          ABSTRACT
A method and an apparatus for the final proofing dough is provided. The apparatus includes a first section and a second section, and a transport device for moving the dough from the first section to the second section. The apparatus is configured to set a dew point inside at least the first section of the apparatus above a predefined temperature of the surface dough before it enters the apparatus. In addition, the apparatus is configured to provide process air into the apparatus. An air speed of process air directly surrounding the dough in the first section is higher than the air speed of process air directly surrounding the dough in the second section.

20 Claims, 10 Drawing Sheets

(56) References Cited

FOREIGN PATENT DOCUMENTS

| JP | H0591831 | A | 4/1993 |
|----|----------|-----|--------|
| SU | 1223874 | A1 | 4/1986 |

OTHER PUBLICATIONS

Search Report from corresponding Netherlands Application No. NL2024529, May 27, 2021.

* cited by examiner

APPARATUS AND METHOD FOR THE FINAL PROOFING OF DOUGH

BACKGROUND

The invention relates to improvements in an apparatus and method for the final proofing of dough.

The final proofing of dough pieces in the production of dough products starts after the molding and/or dough make up, and ends just before the dough pieces are moved into an oven to be baked. The final proofing is the part in the process with the purpose to increase the volume of the dough by activating yeast in the dough.

The process of final proofing is usually performed in a proofing cabinet in which the temperature and humidity are carefully controlled in order to activate or accelerate the proofing process. The time that the dough pieces are arranged in the proofing cabinet is selected to obtain the desired amount of proofing.

It is important that the dough pieces do not dry too much, as this will lead to skin formation. Accordingly, the known proofing cabinets are configured to provide very low air speeds inside the proofing cabinet, to minimize the drying out of the dough.

In addition, the pieces of dough, arranged in a batch proofing cabinet or moving through a continues proofer apparatus, are exposed to a humid atmosphere of substantially constant relative humidity and temperature from the time the pieces of dough enter the proofing device until the pieces of dough are removed from the proofing device for further processing or baking. Accordingly, proofing devices are provided with large air conditioners to keep a difference in temperature over the proofing process low. At the same time, the proofing devices are configured to spread the process air as even as possible over the pieces of dough in the proofing device, and are configured to minimalize high air speeds.

SUMMARY OF THE INVENTION

A disadvantage of the known proofing devices is that their use of very low air speeds is in conflict with providing the needed energy to the dough to activate or accelerate the proofing process. In addition, due to the very low air speeds in the known proofing devices, process control is very difficult and the influence of the environment on the process is large. It is noted that currently the use of very low air speeds in the known final proofing devices is considered to be essential in order to substantially prevent skin formation on the dough pieces in the proofing devices.

It is an object of the present invention to provide an apparatus, assembly and method for the final proofing of dough pieces, which at least partially solves at least one of the above-identified disadvantages.

According to a first aspect, the present invention provides a method for final proofing dough in a proofing device, wherein the method comprises at least two subsequently performed stages comprising an active stage and a passive stage,
wherein a dew point inside the proofing device in the active stage is set above a temperature of the dough, preferably above a temperature of the surface of the dough, before it enters the proofing device, and
wherein an air speed of process air directly surrounding the dough in the active stage is higher than in the passive stage.

Using high air speeds in a final proofing process is completely contradictory to the known teachings of the proofing of dough. However, when the dew point in the proofing cabinet is arranged to be higher than the temperature of the surface of the dough when it enters the proofing device, water from the humid atmosphere inside the proofing device condenses or liquefies on the surface of the dough, and the inventors have realized that high air speeds of process air can be applied to the dough without the risk of drying out and/or undesirable skin formation. Due to the condensing of water on the dough and/or the high air speeds of the process air, the method of the present invention allows to more easily provide energy to the dough to activate or accelerate the proofing process. The inventors have found that the condensation of water on the dough will also provide energy to the dough as a bonus effect.

In addition, due to the high air speeds in the method of the present invention, process control is less difficult because the process air can be better controlled and/or quicker adjusted. In addition, with the high air speeds, a better or more homogeneous temperature distribution in the active stage can be achieved, and/or environmental influences can be minimized.

It is noted that with the term 'the air speed of process air that directly surrounding the dough' is meant the air speed of the process air at a distance from 5 to 50 mm form the surface of the dough. This is actually the air speed of the process air which interacts with the dough.

The inventors found that ones the proofing of the dough has been activated or accelerated, the proofing process inside the dough also generates heat, and there is less or no need to provide additional energy to the dough in order to maintain the proofing process. Accordingly, in the passive stage, also referred to as the resting stage, the air speed of the process air can be reduced to a low level or can be reduced to zero, in order to minimize the drying out of the dough. Any remaining introduction of process air is only needed to maintain the temperature and/or to compensate any heat losses to the environment of the proofing device.

In an embodiment, the air speed of process air which is provided directly to the dough in the proofing device during the active stage, is in a range of 0.5-3.0 meters per second, preferably in a range of 1.0-2.5 meters per second. Such high air speeds of the process air provide a better energy transfer to the dough in comparison with the air speeds in common proofing cabinets.

In an embodiment, the air speed of process air which is provided into the proofing device during the passive stage, is in a range of 0-0.2 meters per second. Such low air speeds of the process air during the passive stage effectively reduces the risk of drying out and/or skin formation at least at the surface of the dough pieces in the passive stage of the proofing device.

In an embodiment, the method comprises a transition from the active stage to the passive stage, wherein the transition is initiated
before or when the temperature of the dough is substantially equal to the dew point inside the proofing device, and/or
after the dough has been in the active stage during a time period which is prescribed by the dough recipe.

Preferably, the transition is initiated before the temperature of the dough becomes higher than the dew point inside the proofing device. When the temperature of the dough becomes higher than the dew point, water from the humid atmosphere inside the proofing device will no longer condense or liquefy on the dough, and the high air speed needs to be stopped in order to circumvent the drying out and/or skin formation on the dough.

Instead of or in addition to determining the temperature of the dough and the dew point in the proofing device or the difference between these two temperatures, the apparatus is configured to establish whether or not water from the humid atmosphere condenses or liquefies on the dough surface, in order to establish whether or not the first stage needs to be stopped in order to circumvent the drying out and/or skin formation on the dough. This embodiment provides an alternative way of determining whether or not the high air speed can safely be used to provide energy to the dough.

In addition to or alternatively, the method of the inventions can also be time-controlled. Accordingly, in an embodiment, the active stage is provided during an active time period, wherein the active time period is dependent on the dough recipe, a desired final dough structure and/or the working conditions in the proofing device. These working conditions comprises one or more of a dew point, temperature of the process air, speed of the process air, etc. Ones it has been established that during the active time period, the heating of the dough in the proofing device does not lead to an undesired amount of skin formation, the proofing process can be controlled by providing the active stage during the active time period. In this situation, measurements of the temperature and/or humidity of the dough and/or the air in the proofing device are not necessary. In an embodiment, the passive stage is provided during a passive time period, wherein the passive time period is preferably independent on the dough recipe.

In an embodiment, the active stage is provided during an active time period, wherein the passive stage is provided during a passive time period, and a ratio between the active time period and the passive time period is in a ranged from 1:4 to 1:10, preferably in a range from 1:5 to 1:8. As indicated above, ones the proofing of the dough has been activated or accelerated, the proofing process inside the dough also generates heat, and there is less or no need to provide additional energy to the dough in order to maintain the proofing process. Accordingly, the active stage only needs to be a small part of the total duration of the proofing process. The inventors have found that the above ratios between the active time period and the passive time period provides at least comparable or even better proofing results for a large variety of doughs or dough recipes.

In an embodiment, heat is supplied to the dough during the active stage, in particular via the process air, wherein the heat is preferably symmetrically supplied to the dough. This is in particular desirable when a plurality of dough pieces is arranged in the proofing device. During the active time most of the energy is supplied to the dough pieces and therefore it is highly advantageous that all the dough pieces receive substantially the same amount of heat and/or the same heating rate. In the active stage, the proofing process is activated and/or accelerated, and this highly determines the volume of the proofed dough. Therefore, with the symmetrical heating process, uneven proofing of different dough pieces can be minimized.

It is noted that this symmetrical supply of heat may be spatially symmetric and/or temporally symmetric. This symmetric heating in space and/or in time provides substantially the same amount of heat to substantially all the dough pieces during the time period that they are in the active stage.

In an embodiment, in the active stage the process air is provided onto the dough, preferably the air is directed directly onto the surface of the dough. By providing the process air onto the dough during the active stage, energy is more effectively transferred to the dough.

In an embodiment, in the passive stage the process air is directed along or around dough carrying or dough holding parts of the apparatus for the proofing of dough. The process air is preferably not directed directly onto and/or over the surface of the dough. In the passive stage, the dough surface is more sensitive for skin formation. By directing the process air along or around the dough carrying or dough holding parts of the apparatus for the proofing dough during the passive stage, the dough carrying or dough holding parts are at least partially or substantially isolated from the environment and this allows to provide a controlled environment for the dough in the passive stage and the risk of undesirable skin formation is further reduced.

In an embodiment, the process air in the active stage has a temperature below 45 degrees Celsius, preferably below 40 degrees Celsius. The method of the present invention allows to use process air with a higher temperature, at least compared with the commonly used temperatures in a proofing cabinet for a specific dough recipe. The height of the process air in the active stage is limited by what the specific dough can handle without resulting in uneven structures in the dough.

It is noted that air speed in the active stage is much higher than used in conventional proofing cabinets, and accordingly the temperature of the process air does not need to be extremely high in order to provide sufficient energy to the dough to activate or accelerate the proofing process.

It is further noted that for some dough recipes, a small and controlled amount of drying out at the surface of the dough is desired, and for such doughs the method comprises the step of holding the dough a predetermined time longer in the active stage, preferably a predetermined time after the temperature of the dough surface becomes higher than the dew point inside the proofing device.

In an embodiment, the method of the present invention comprises the step of providing additional heat to the dough in the active stage by one or more of magnetron radiation, Joule or Electric heating.

According to a second aspect, the present invention provides a computer-readable medium having computer-executable instructions adapted to cause a proofing apparatus or a control device thereof to perform the method, or an embodiment thereof, as described above.

According to a third aspect, the present invention provides an apparatus for final proofing dough, wherein the apparatus comprises a proofing chamber for holding dough, wherein the apparatus is configured to perform at least two subsequently stages comprising an active stage and a passive stage, wherein the apparatus which is configured to set a dew point inside the proofing chamber of the apparatus above a predefined temperature of the dough, preferably the surface of the dough, before it enters the apparatus, and wherein the apparatus is configured to provide process air into the apparatus, wherein an air speed of process air directly surrounding the dough during the active stage is higher than the air speed of process air surrounding the dough during the passive stage.

This apparatus according to the present invention provides the same advantages as described above for the method according to the invention. It is noted that this apparatus according to the invention, is configured to use the method as described above, in particular in the proofing chamber of said apparatus. It is noted that in an embodiment, the apparatus is configured to arrange the dough at a stationary position inside the same proofing chamber during the active and the passive stage. This embodiment allows the proofing of batches of dough pieces, which batches are subsequently arranged in the apparatus.

In an embodiment, the apparatus configured to provide the process air to the dough during the first stage at an air speed of the process air in a range of 0.5-3.0 meters per second, preferably in a range of 1.0-2.5 meters per second. In an embodiment, the apparatus is configured to provide the process air into the passive stage at an air speed of the process air in a range of 0-0.2 meters per second.

In an embodiment, the apparatus is configured to stop the active stage and to activate the passive stage when a temperature of the dough in the proofing chamber is equal or smaller than the dew point in the proofing chamber. In an embodiment, the change from the active stage to the passive stage is time controlled, wherein the time that the apparatus is in the active stage can be selected preferably in dependence of the particular dough recipe, a desired final dough structure and/or the working conditions. In addition or alternatively, in an embodiment, the change of the active stage to the passive stage is initiated on or before the temperature of the dough in the proofing chamber becomes higher than the dew point in the proofing chamber. As already indicated above, when the temperature of the dough in the proofing chamber becomes higher than the dew point in the proofing chamber, water from the humid atmosphere inside the proofing device will no longer condense or liquefy on the dough, and the high air speed needs to be stopped in order to circumvent the drying out and/or skin formation on the dough.

It is noted that for some dough recipes, a small and controlled amount of drying out at the surface of the dough is desired, and for such doughs the apparatus is controlled to hold the dough a predetermined time longer in the active stage, preferably a predetermined time after the temperature of the dough surface becomes higher than the dew point inside the proofing chamber.

In and embodiment, the apparatus comprises a heating device for providing additional heat to the dough in the active stage. Preferably said heating device comprises one or more of a magnetron-heating device, a Joule heating device or an electric heating device.

According to a fourth aspect, the present invention provides an apparatus for final proofing dough, wherein the apparatus comprises a first section and a second section and a transport device for moving the dough from the first section to the second section, wherein the apparatus which is configured to set a dew point inside at least the first section of the apparatus above a predefined temperature of the dough, preferably the surface of the dough, before it enters the apparatus, and wherein the apparatus is configured to provide process air into the apparatus, wherein an air speed of process air directly surrounding the dough in the first section is higher than the air speed of process air surrounding the dough in the second section.

This apparatus according to the present invention provides the same advantages as described above for the method according to the invention. It is noted that this apparatus according to the invention, is configured to use the method as described above. However, it is noted that this apparatus comprises a first section, which is configured to perform the active stage on the dough, a second section which is configured to perform the passive stage on the dough, and a transport device for moving the dough from the first section to the second section.

In an embodiment, the first and second section are arranged inside a single proofing chamber, or, in an alternative embodiment, the first and second section are arranged each in separate proofing chambers, which are preferably arranged adjacent to each other.

In an embodiment, the apparatus configured to provide the process air to the dough in the first section at an air speed of the process air in a range of 0.5-3.0 meters per second, preferably in a range of 1.0-2.5 meters per second.

In an embodiment, the apparatus is configured to provide the process air into the second section at an air speed of the process air in a range of 0-0.2 meters per second.

The change from the active stage in the first section to the passive stage in the second section may be time controlled, wherein the time that the dough is in the first section and/or second section can be selected in dependence of the particular dough recipe, a desired final dough structure and/or the working conditions. In an embodiment, the apparatus is configured to keep the dough in the first section during an active time period.

In case the temperature of the dough surface in the first section becomes higher than the dew point in said first section, water from the humid atmosphere inside the first section will no longer condense or liquefy on the dough, and the dough needs to be moved to the second section in order to circumvent the drying out and/or skin formation on the dough.

It is noted that for some dough recipes, a small and controlled amount of drying out at the surface of the dough is desired, and for such doughs the apparatus is controlled to hold the dough a predetermined time longer in the first section, preferably a predetermined time after the temperature of the dough surface becomes higher than the dew point in the first section.

Accordingly, in an embodiment, the apparatus is configured to determine a difference between the temperature of the dough, preferably the surface of the dough, in the first section and the dew point in the first section. In an embodiment, the apparatus is configured to activate the transport device when the temperature of the surface of the dough in the first section is equal or smaller than the dew point in the first section, or after a predetermined time period after the temperature of the surface of the dough is equal or higher than the dew point in the first section.

In an embodiment, the apparatus is configured to control the conditions in the first section based on the dough recipe of the dough that needs to be proofed. Preferably, the time period that the dough is in the first section and/or the transition from the first section to the second section is controlled based on the dough recipe. In an embodiment, the apparatus is configured to have substantially the same conditions in the second section for all dough recipes. Thus, the conditions in the second section is substantially independent of the dough recipe. The conditions comprise one or more of a temperature, humidity, process air flow velocity, process air temperature, and time period the dough is arranged in a certain section.

In an embodiment, the apparatus is configured to keep the dough in the second section during a passive time period, wherein a ratio between the active time period and the passive time period is preferably in a ranged from 1:4 to 1:10, more preferably in a range from 1:5 to 1:8.

In an embodiment, the first section is configured to supply heat to the dough, in particular via the process air, wherein the heat is preferably symmetrically supplied to the dough. This is in particular desirable when a plurality of dough pieces is arranged in the first section. During the active time in the first section most of the energy is supplied to the dough pieces and therefore it is advantageous that the dough pieces receive the same amount of heat and/or the same heating rate. In the first section, the proofing process is activated and/or accelerated and this highly determines the volume of the proofed dough. Therefore, with the symmetrical heating process, uneven proofing of different dough pieces can be minimized. It is noted that this symmetrical heating process is preferably configured so that averaged over the active time, each dough piece in the first section receives substantially the same amount of energy.

In an embodiment, the first section is configured to provide the process air to the dough. Preferably, the air is directed directly onto the surface of the dough. By providing the process air onto the dough during the active stage, energy is more effectively transferred to the dough.

In an embodiment, the second section is configured to direct the process air along or around dough carrying or dough holding parts of the apparatus for the proofing of dough. The process air is preferably not directed directly onto and/or over the surface of the dough. In the second section, the dough surface is more sensitive for skin formation. By directing the process air along or around the dough carrying or dough holding parts of the apparatus for the proofing dough in the second section, the dough carrying or dough holding parts are at least partially or substantially isolated from the environment and this allows to provide a controlled environment for the dough in the second section and the risk of undesirable skin formation is further reduced.

In an embodiment, first section is configured to provide process air having a temperature below 45 degrees Celsius, preferably below 40 degrees Celsius.

In and embodiment, the first section of the apparatus comprises a heating device for providing additional heat to the dough in the active stage. Preferably said heating device comprises one or more of a magnetron heating device, a Joule heating device or an electric heating device.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of an exemplary embodiment shown in the attached drawings, in which.

DETAILED DESCRIPTION OF THE INVENTION

Figure 1A:
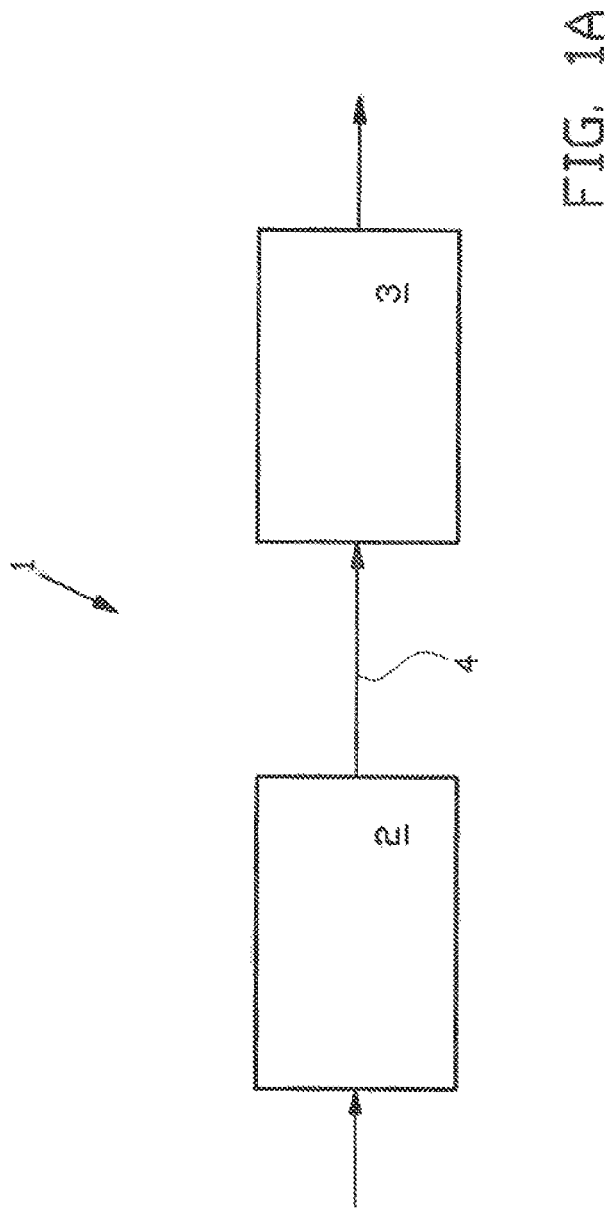
FIG. 1A shows a schematic representation of a block diagram of the method of the invention, FIG. 1B schematically shows an example of the development of the temperature of the dough, FIG. 2 schematically shows a first example of an apparatus according to the invention, FIG. 3 schematically shows a second example of an apparatus according to the invention, FIG. 4 schematically shows a third example of an apparatus according to the invention, FIG. 5 schematically shows a fourth example of an apparatus according to the invention, FIG. 6 schematically shows a fifth example of an apparatus according to the invention, FIG. 7 schematically shows a sixth example of an apparatus according to the invention, FIG. 8 schematically shows a seventh example of an apparatus according to the invention, and FIG. 9 schematically shows an example of an accessory kit for modifying a proofing apparatus into a device according to the invention.

FIG. 1A shows a schematic representation of a block diagram 1 of a method for final proofing dough in a proofing device. The method comprises at least two subsequently performed stages: an active stage 2 and a passive stage 3. At or before the dough is subjected to the active stage 2, the dew point inside the proofing device is or has been set such that said dew point is above a temperature of the dough, preferably the surface of the dough, before said dough enters the proofing device. In addition, the air speed of process air in the active stage 2 is higher than in the passive stage 3. Typically, the air speed of process air which is provided to the dough in the proofing device during the active stage 2, is in a range of 0.5-3.0 meters per second, preferably in a range of 1.0-2.5 meters per second. Furthermore, the air speed of process air which is provided into the proofing device during the passive stage 3, is in a range of 0-0.2 meters per second. The passive stage 3 is sometimes referred to as the resting stage.

As schematically indicated in FIG. 1A, the method comprises a transition 4 from the active stage 2 to the passive stage 3. The transition 4 is initiated before or when the temperature of the dough is substantially equal to the dew point inside the proofing device, or a predetermined time after the temperature of the dough surface becomes higher than the dew point in the first section in order to provide a small and controlled amount of drying out at the surface of the dough.

Figure 1B:
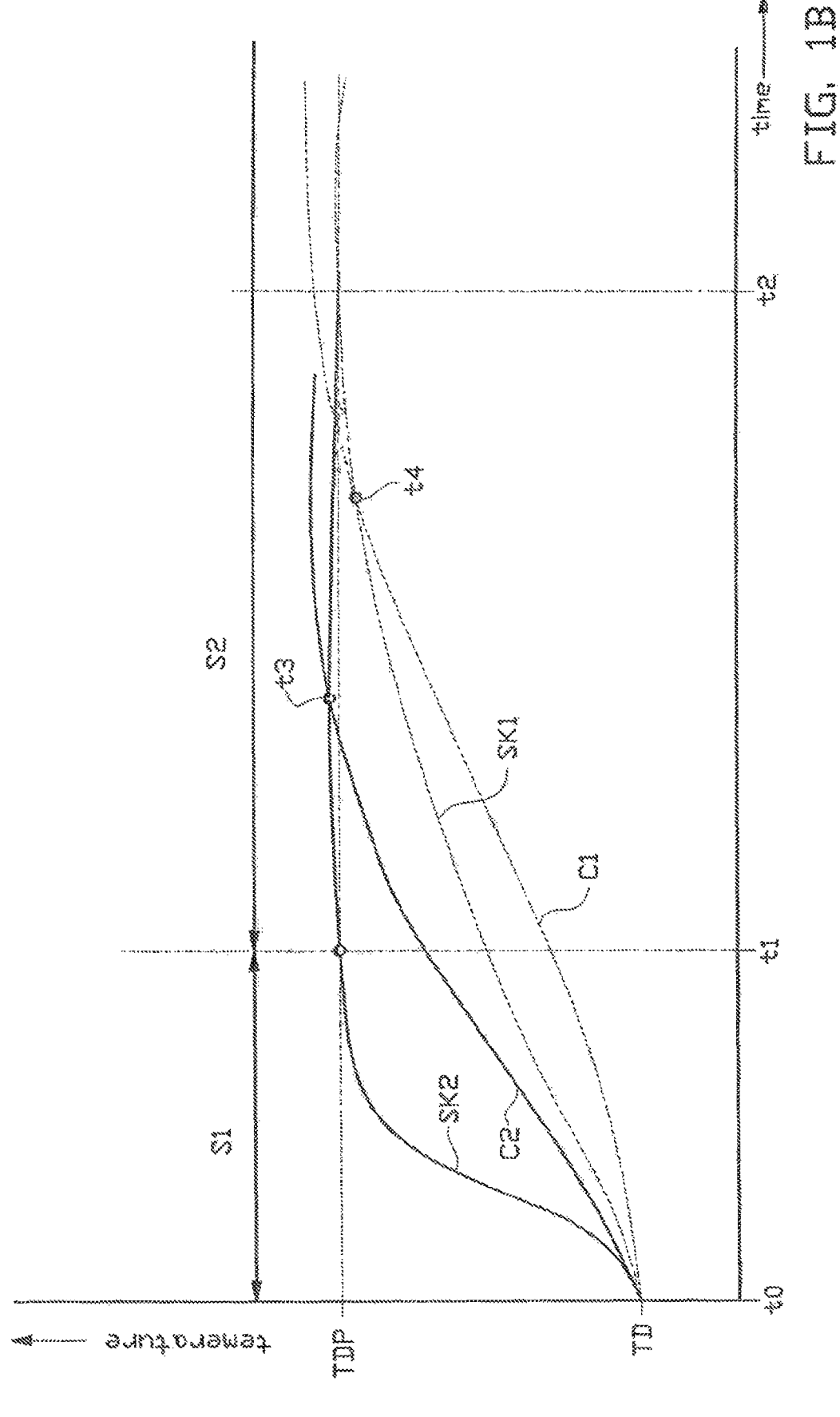

FIG. 1B schematically presents some examples of the development of the temperature of the dough in time during a proofing process.

In a first example SK1, C1, the development of the temperature of the dough is presented in case that the air speed of process air which is provided into the proofing device during the whole proofing process is constantly at a low level, preferably in a range of 0-0.2 meters per second. The example schematically shows the development of the temperature of the surface SK1 of the dough and the development of the temperature of the core C1 of the dough. As indicated in FIG. 1B, the temperature TD of the dough when the proofing process starts is lower than the dew point TDP. The temperature of the dough slowly increases.

During the time period between t0 and t2, the temperature of the surface SK1 of the dough is below the dew point TDP, and water from the humid atmosphere inside the proofing device condenses or liquefies on the dough. After t2, the temperature of the surface SK1 of the dough is higher than the dew point, and water at the surface of the dough evaporates. Since the air speed of process air is constantly at a low level, there is a substantially negligible risk of drying out and/or undesirable skin formation.

In a second example SK2, C2, the development of the temperature of the dough is presented in case the proofing process comprises at least two subsequently performed stages, an active stage S1 and a passive stage S2, wherein an air speed of process air in the active stage S1 is higher than in the passive stage S2. As clearly indicated in FIG. 1B, the temperature TD of the dough when the proofing process starts is lower than the dew point TDP. However, the development of the temperature of the surface SK2 of the dough and the development of the temperature of the core C2 of the dough is much faster, due to the increased air speed in the active stage S1.

During the time period between t0 and t1, the temperature of the surface SK2 of the dough is below the dew point TDP, and water from the humid atmosphere inside the proofing device condenses or liquefies on the dough. At least during a part of this time period between t0 and t1, the air speed of the process air can be high without a risk of drying out and/or undesirable skin formation. Due to the high air speed, much more energy is provided to the dough to activate or accelerate the proofing process.

After t1, the temperature of the surface SK2 of the dough becomes higher than the dew point TDP, and water at the skin of the dough evaporates. At least at this moment in time, or earlier than this moment in time, the air speed of process air must be switched to a low level in order to at least reduce the risk of drying out and/or undesirable skin formation. Accordingly, the transition from the active stage to the passive stage is initiated at or before t1, or a predetermined time after t1. Accordingly, the active stage is provided during an active time period, wherein the active time period is preferably dependent on the dough recipe, a desired final dough structure and/or the working conditions.

It is noted that also the working conditions, such as the temperature of the process air and/or the speed and direction of the process air may be optimized and/or adapted for different dough recipes in order to obtain the desired proofing results for the dough pieces with different dough recipes.

It is further noted that in order to make optimal use of the method of the present invention, the active stage S1 with a high air speed of process air is provided during an active time period which runs from t0 to t1 (the moment in time when the temperature of the surface SK2 of the dough is equal to the dew point TDP), or a predetermined time period after t1 in order to desired amount of drying out of the surface of the dough. At least at t1 or the predetermined time period after t1, the method changes from the active stage S1 to the passive stage S2 with a low air speed of process air.

The passive stage S2 is provided during a passive time period. The passive time period may be dependent on the dough recipe, a desired final dough structure and/or the working condition. However, preferably, the passive time period is substantially independent on the dough recipe. In this case the passive time period can be substantially the same for all different types of dough, which can assist in simplifying the proofing process and/or the proofing apparatus, for example by enabling to process several batches of dough pieces of different recipes in the same passive process and/or in the same passive section of the proofing apparatus.

It is also noted that in the proofing method of the present invention, the surface SK2 and the core C2 of the dough piece reach much sooner, at time t3, an equal temperature, when we compare this to the time t4 in case that the air speed of process air which is provided into the proofing device during the whole proofing process is constantly at a low level.

Since the active stage S1 according to the present invention allows to provide energy to the dough at a much higher rate that in the usual proofing methods, the active stage S1 can be relatively short. Ones the proofing of the dough has been activated or accelerated during the active stage S1, the proofing process inside the dough also generates heat, and there is less or no need to provide additional energy to the dough in order to maintain the proofing process in the passive stage S2. Typically, the ratio between the active time period and the passive time period S1:S2 is in a ranged from 1:4 to 1:10, preferably in a range from 1:5 to 1:8.

Figure 2:
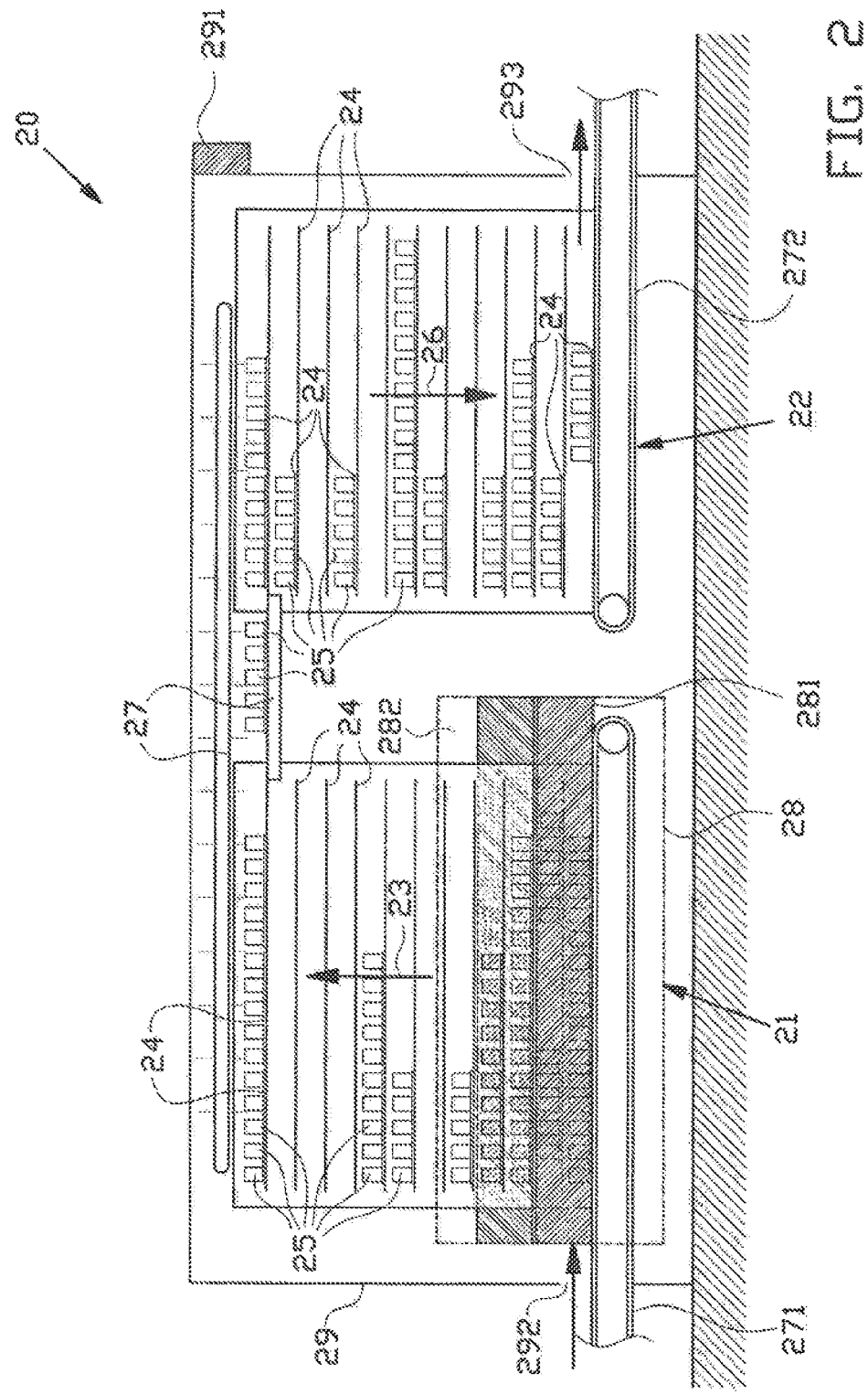

FIG. 2 schematically shows a first example of an apparatus according to the invention. In this example, the apparatus 20 comprises at least two adjacently positioned lift units 21, 22. A first lift unit 21 is configured for intermittent upward 23 conveyance of holders 24 for dough pieces 25 and a second lift unit 22 is configured for intermittent downward 26 conveyance of the holders 24 for dough pieces 25. In addition, a transfer device 27 is configured for at the upper side of the lift units 21, 22 transferring the holders 24 for dough pieces 25 from the first lift unit 21 to the second lift unit 22. Preferably, each lift compartment is provided with pairs of elongated supporting elements 241 that are placed above one another, wherein the supporting elements 241 of each pair are situated horizontally spaced apart from each other for supporting a product holder 24. The holders 24 with pieces of dough 25 are supplied into the apparatus via an input conveyor 271. Subsequently the holders 24 are picked up by the supporting elements 241 and moved upward 23. At the upper side of the first lift unit 21, the holders 24 are transferred from the supporting elements of the first lift unit 21 onto the supporting elements of the second lift unit 22 by the transfer device 27. Subsequently the holders 24 are moved downward 26 until they are arranged on the output conveyor 272, which is configured to remove the holders 24 out of the apparatus 20.

As schematically indicated in FIG. 2, the first lift unit 21 comprises a first section 28, which is configured to provide process air at a high speed to the dough pieces 25 in the first section 28 in order to put the dough 25 through the active stage of the method of the invention. In particular, the first section 28 is arranged at a lower part of the first lift unit 21, adjacent to the input opening 292.

The first section 28 is configured to supply heat to the dough 25, preferably via the supply of process air. In the example of FIG. 2, the apparatus 20 comprises an air supply which covers at least part of the first section 28 and which is arranged to blow process air into the first section 28, in a substantial horizontal direction in between the holders 24, in particular in a direction substantially perpendicular to the plane of FIG. 2. Preferably, the apparatus 20 comprises two air supplies at opposite sides of holders 24 in the first section 28 in order substantially symmetrically supply the process air to the dough 25 in the first section 28.

More in particular, the first section 28 comprises a first air supply 281, which in the view of FIG. 2 is arranged in front of the holders 24 and which is configured to blow process air into the first section 28 in a direction away from the viewer, and a second air supply 282, which in the view of FIG. 2 is arranged behind the holder 24 and which is configured to blow process air into the first section 28 in a direction towards the viewer, thus in a direction opposite to the direction of the first air supply 281. As schematically shown in FIG. 2, the first air supply 281 is arranged at a lower vertical position with respect to the second air supply 282. This ensures that temperature differences over the cross section of the first section 28 are at least substantially eliminated. The first air supply 281 and the second air supply 282 are preferably configured to provide the process air to the dough 25 in the first section 28 at an air speed of the process air in a range of 0.5-3.0 meters per second, preferably in a range of 1.0-2.5 meters per second.

In the example as shown in FIG. 2, the apparatus 20 comprises a single housing or chamber 29, wherein both the first lift unit 21 and the second lift unit 22 are arranged inside said chamber 29. Also the first section 28 is arranged inside said chamber 29. The remaining part of the chamber 29, outside the first section 28 provides the second section, which is configured to provide process air at a low speed into said second section. Preferably, the apparatus 20 is configured to provide the process air into the second section at an air speed of the process air in a range of 0-0.2 meters per second. At least the remaining part of the chamber 29, outside the first section 28, comprises a well-insulated area with minimum air speed to avoid skin forming. At this part of the proofing apparatus 20 less or no energy needs to be provided to the dough 25, and the energy provided by the low speed process air is mainly used to compensate for energy losses through the walls and floor of the chamber 29, and for energy losses through the transport openings, in particular the outlet 293.

Actually, in the example of FIG. 2, there are no air supplies provided in the second section, but the process air which is blown at high speed into the first section 28, is directed along and around the part of the first lift unit 21 and the second lift unit 22 which are arranged outside the first section 28, preferably at a low air speed.

Preferably, the chamber 29 is provided with an air return outlet 291, at a position at the upper side of the second lift unit 22 and at a side of the second lift unit 22 facing away from the first lift unit 21.

It is noted that the part of the chamber 29 outside the first section 28 is much larger than the first section 28. Since the holders 24 with the dough 25 move upward through the first section 28 at the same speed as the holders 24 move upward and subsequently downward through the second section, the time that the dough 25 is in the first section 28, also denoted as an active time period, is shorter than the time that the dough 25 is in the second section, also denoted as a passive time period. Preferably the apparatus 20 is configured such that the a ratio between the active time period and the passive time period is in a range from 1:4 to 1:10, preferably in a range from 1:5 to 1:8.

It is further noted that, in use, the dew point inside the chamber 29, and in particular inside the first section 28, is set above a temperature of the dough, in particular the surface of the dough that enters the apparatus 20 via the input opening 292.

Figure 3:
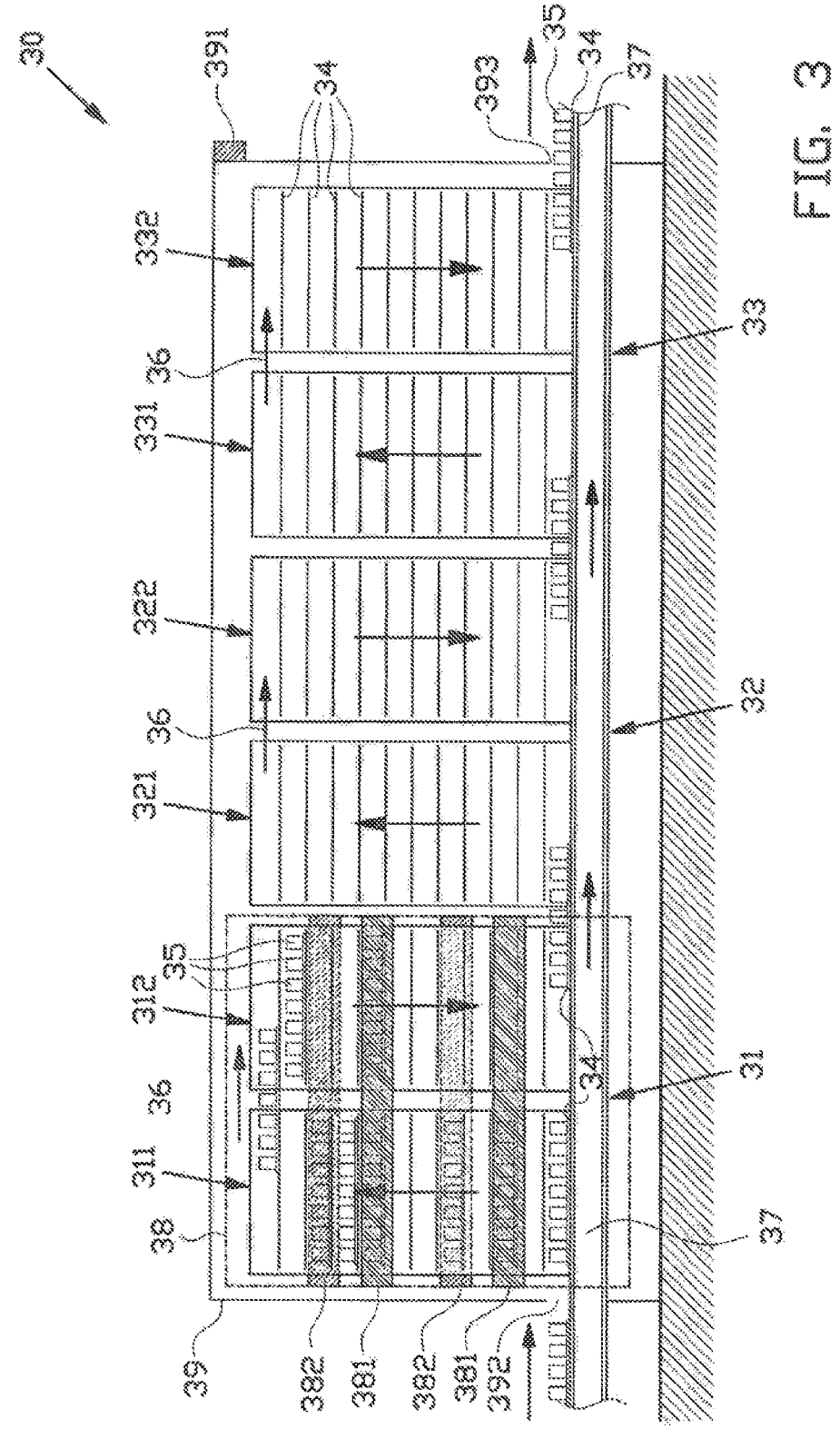

FIG. 3 schematically shows a second example of an apparatus according to the invention. In this example, the apparatus 30 comprises multiple adjacently positioned lift unit pairs 31, 32, 33. Each lift unit pair 31, 32, 33 comprises a first lift unit 311, 321, 331 which is configured for intermittent upward conveyance of holders 34 for dough 35 and a second lift unit 312, 322, 332 which is configured for intermittent downward conveyance of the holders 34 for dough 35, and with a transfer device 36 which is configure for at the upper side of the lift units pairs 31, 32, 33 transferring the holders 34 for dough 35 from the first lift unit 311, 321, 331 to the second lift unit 312, 322, 332. Furthermore, the apparatus 30 comprises one or more further transfer devices, in the present example a single conveyor 37 which are configured for at the lower side of the lift unit pairs 31, 32, 33 transferring the holders 34 for dough 35 from the second lift unit 312, 322 of a lift unit pair 31, 32 to the first lift unit 321, 331 of a subsequent lift unit pair 32, 33. Furthermore, each lift compartment is provided with pairs of elongated supporting elements 341 that are placed above one another, wherein the supporting elements 341 of each pair are horizontally spaced apart from each other for supporting a holder 34.

It is noted that due to the single conveyor 37 which extends below several lift unit pairs 31, 32, 33, the holders 34 for dough 35 can also be transferred from the first lift unit pair 31 to a lift unit not directly adjacent to said first lift unit pair 31, for example to shorten the lingering period of the dough 35 in the apparatus 30.

As schematically indicated in FIG. 3, the first lift unit pair 31 adjacent to the input opening 392 comprises a first section

38, which is configured to provide process air at a high speed to the dough 35 in the first section 38 in order to apply the active stage of the method of the invention to the dough 35.

The first section 38 is configured to supply heat to the dough 35, preferably via the supply of process air. accordingly, the apparatus 30 comprises an air supply which covers at least part of the first section 38 and which is arranged to blow process air into the first section 38, in a substantial horizontal direction in between the holders 34, in particular in a direction substantially perpendicular to the plane of FIG. 3. Preferably, the apparatus 30 comprises air supplies 381, 382 at opposite sides of holders 34 in the first section 38 in order substantially symmetrically supply the process air to the dough 35 in the first section 38.

More in particular, the first section 38 comprises first air suppliers 381, which in the view of FIG. 3 are arranged in front of the holders 34 and which are configured to blow process air into the first section 38 in a direction away from the viewer, and second air suppliers 382, which in the view of FIG. 3 are arranged behind the holder 34 and which are configured to blow process air into the first section 38 in a direction towards the viewer, thus in a direction opposite to the direction of the first air suppliers 381. As schematically shown in FIG. 3, the first and second air suppliers 381, 382 are arranged staggered in a vertical direction. This ensures that temperature differences over the cross section of the first section 38 are at least substantially eliminated. The first and second air suppliers 381, 382 are preferably configured to provide the process air to the dough 35 in the first section 38 at an air speed of the process air in a range of 0.5-3.0 meters per second, preferably in a range of 1.0-2.5 meters per second.

In the example as shown in FIG. 3, the apparatus 30 comprises a single housing or chamber 39, wherein multiple adjacently positioned lift unit pairs 31, 32, 33 are arranged inside said chamber 39. Also the first section 38 is arranged inside said chamber 39. The remaining part of the chamber 39, outside the first section 38 provides the second section, which is configured to provide process air at a low speed into said second section. Preferably, the apparatus 30 is configured to provide the process air into the second section at an air speed of the process air in a range of 0-0.2 meters per second. At least the remaining part of the chamber 39, outside the first section 38, comprises a well-insulated area with minimum air speed to avoid skin forming. At this part of the proofing apparatus 30 less or no energy needs to be provided to the dough 35, and the energy provided by the low speed process air is mainly used to compensate for energy losses through the walls and floor of the chamber 39, and for energy losses through the transport openings, in particular the outlet 393.

Actually, in the example of FIG. 3, there are no air supplies provided in the second section, but the process air which is blown at high speed into the first section 38, is directed along and around the part of the second and further lift unit pairs 32, 33 which are arranged outside the first section 38, preferably at a low air speed.

Furthermore, the chamber 39 is provided with an air return outlet 391, at a position at the upper side of the sidewall of the chamber 39, which comprises the outlet 393.

Again, the part of the chamber 39 outside the first section 38 is much larger than the first section 38. Since the holders 34 with the dough 35 move through the various lift unit pairs 31, 32, 33 preferably at the same speed, the time that the dough 35 is in the first section 38, also denoted as an active time period, is usually shorter than the time that the dough 35 is in the second section, also denoted as a passive time period.

It is noted that the chamber 39 may be provided with more than three lift unit pairs and/or the lift unit 31 in the first section 38 may be of a different size, preferably less high, than the lift units in the second section of the chamber 39.

It is further noted that, in use, the dew point inside the chamber 39, and in particular inside the first section 38, is set above a temperature of the surface of the dough that enters the apparatus 30 via the input opening 392.

Figure 4:
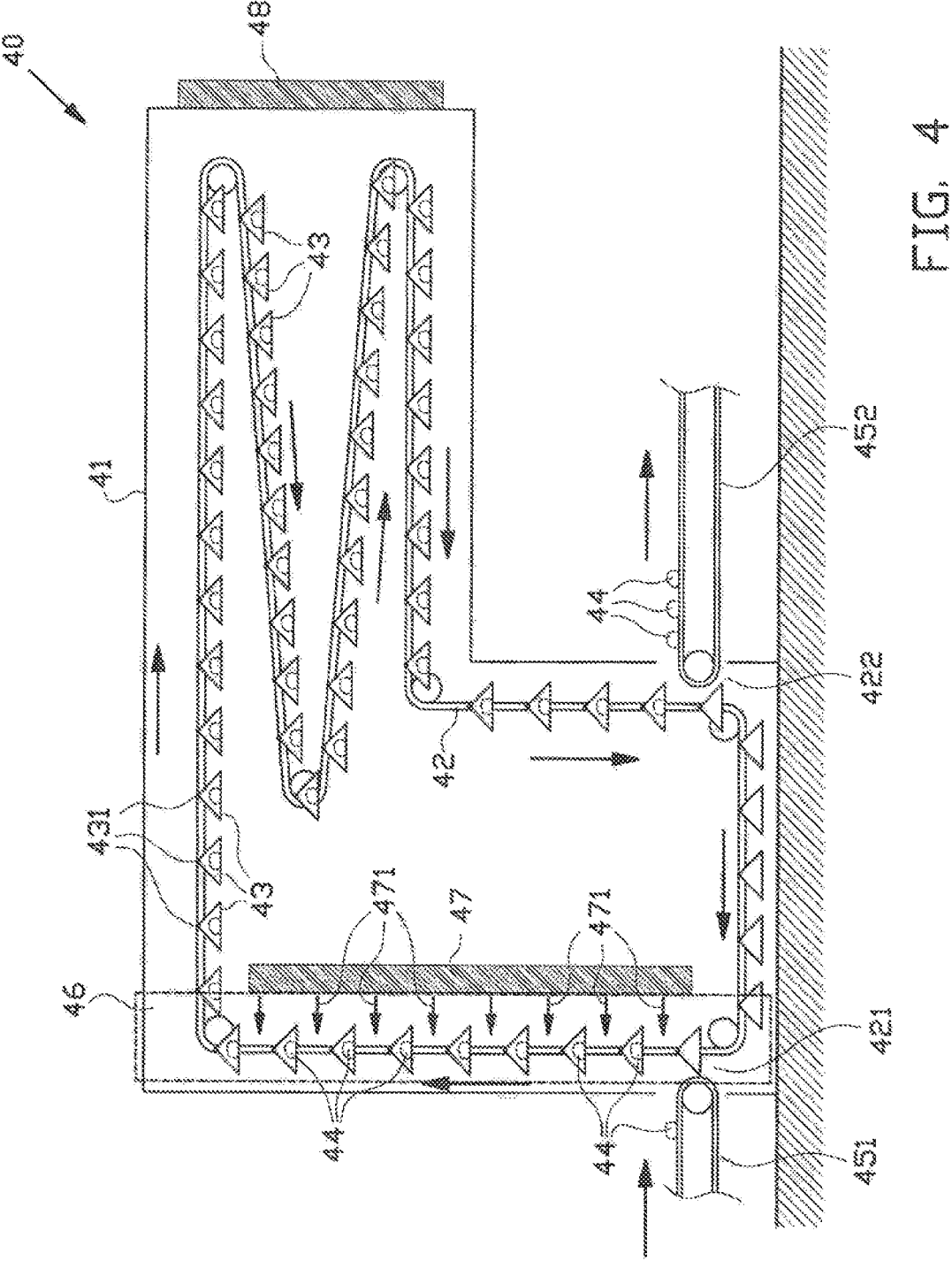

FIG. 4 schematically shows a third example of an apparatus 40 according to the invention. In this example, the apparatus 40 comprises a chamber 41 and an endless conveyor 42, which endless conveyor is configured to travel in a tortuous path through said chamber 41. The conveyor 42 carries a plurality of trays 43 for carrying dough. Preferably, each tray 43 of the plurality of trays is a hanging tray, which is suspended from the conveyer 41, preferably via a pivot joint 431 comprising a substantially horizontal pivot axis.

Pieces of dough 44 are supplied into the apparatus via an input conveyor 451. Subsequently, the pieces of dough 44, which enter the apparatus via the inlet 411, are deposited on a tray 43 of the plurality of trays at a first position 421 along the tortuous path. The pieces of dough 44 travel through the apparatus 40 along said tortuous path. When they reach the outlet 412, the pieces of dough 44 are transferred onto an output conveyor 452 at a second position 422 along the tortuous path, which is configured to remove the pieces of dough 44 out of the apparatus 40.

As schematically shown in FIG. 4, the tortuous path extends through the first section 46. The first section 46 is arranged adjacent to the input opening 411, and is configured to provide process air at a high speed to the dough 44 on the trays 43 in said first section 46 in order to apply the active stage of the method of the invention to the dough 44. The first section 46 is configured to supply heat to the dough 44, preferably via the supply of process air. Accordingly, the apparatus 40 comprises an air supply 47 which covers at least part of the first section 46 and which is arranged to blow process air into the first section 46, in a substantial horizontal direction 471 in between the trays 43, in particular in a direction substantially parallel to the plane of FIG. 4.

In use, the dew point in at least the first section 46 is set well above the temperature of the surface of the dough pieces 44 on the input conveyor 451.

In the example as shown in FIG. 4, the apparatus 40 comprises a single housing or chamber 41. As schematically shown in FIG. 4, the first section 46 is arranged inside said chamber 41. The remaining part of the chamber 41, outside the first section 46 provides the second section, which is configured to provide process air at a low speed into said second section. At least the remaining part of the chamber 41, outside the first section 46, comprises a well-insulated area with minimum air speed to avoid undesired skin forming. The second section is arranged between the first section 46 and at least the second position 422. At this part of the proofing apparatus 40 less or no energy needs to be provided to the dough 44, and the energy provided by the low speed process air is mainly used to compensate for energy losses through the walls and floor of the chamber 41, and for energy losses through the transport openings, in particular the outlet at the second position 422. The second position 422 is configured to remove dough 44 from a tray 43 of the plurality of trays, and wherein the second section is arranged along at least at a second part of the tortuous path between the first section 46 and the second position 422. As shown in FIG. 4, the first section 46 is arranged along at least a first part of the tortuous path between the first position 421 and the second section.

In the second section, there are no air supplies provided, but the process air, which is blown at high speed into the first section 46, is directed along and around the tortuous path in the second section, preferably at a low air speed. Furthermore, the chamber 41 is provided with an air return outlet 48, at a position at a side of the chamber 41 substantially opposite to the side where the first section 46 is located.

Again, the part of the chamber 41 outside the first section 46 is much larger than the first section 46. Since the trays 43 with the dough 44 move along the tortuous path at the same speed, the time that the dough 44 is in the first section 46, also denoted as an active time period, is much shorter than the time that the dough 44 is in the second section, also denoted as a passive time period.

It is further noted that, in use, the dew point inside the chamber 41, and in particular inside the first section 46, is set above a temperature of the dough that enters the apparatus 40 via the input opening at the first position 421.

Figure 5:
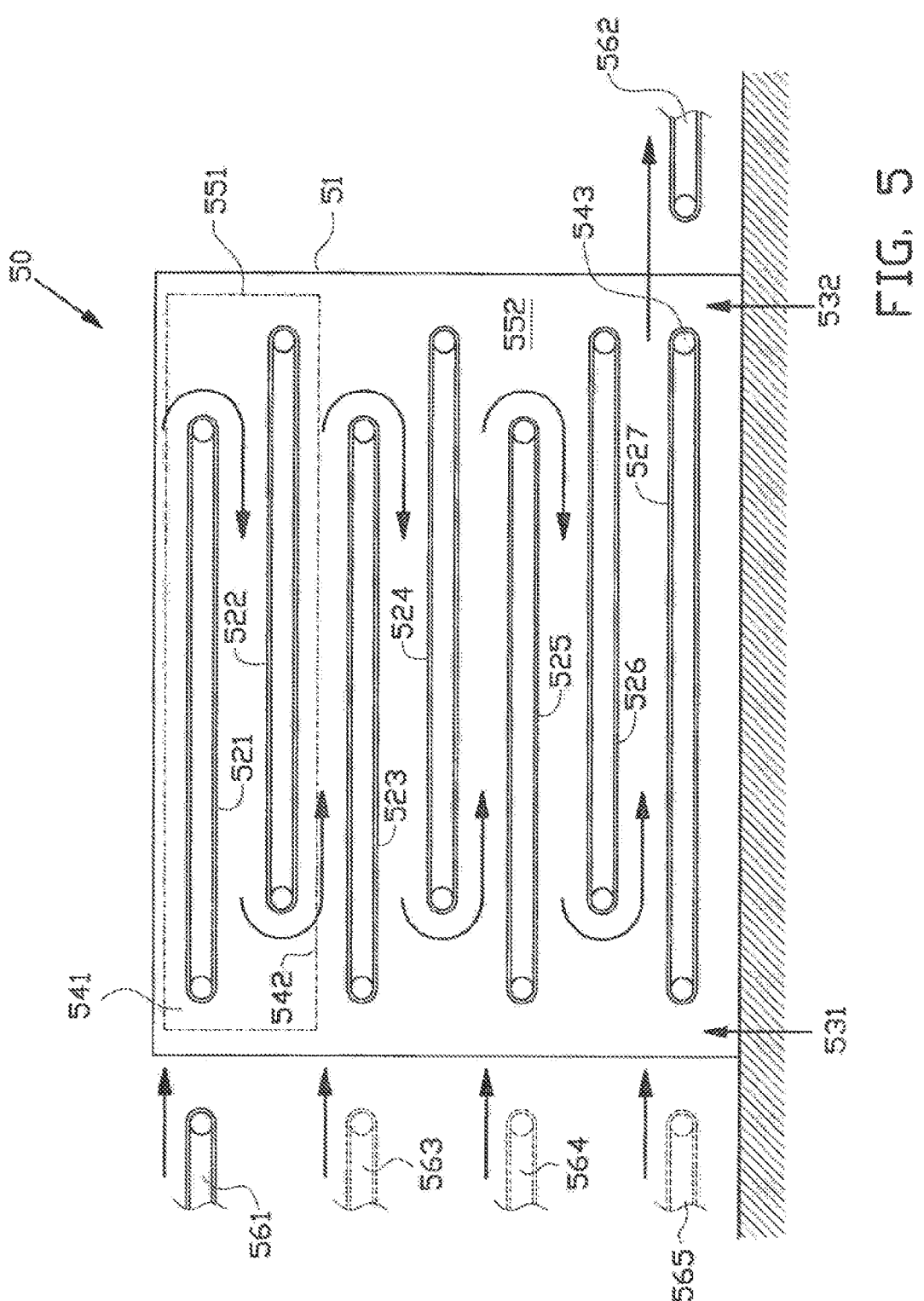

FIG. 5 schematically shows a fourth example of an apparatus 50 according to the invention. In this example the apparatus 50 comprises a chamber 51 and a conveyor assembly 521, 522, 523, 524, 525, 526, 527, said conveyor assembly 521-527 comprising a plurality of conveyors which are configured to provide a conveying path comprising a repeated horizontal movement of the dough pieces on top of the conveyors between one end 531 and the other end 532 of the chamber 51 and short vertical movements at said ends. The apparatus 50 comprises a first position 541 along the conveying path which first position is configured to deposit dough on a conveyor 521 of the plurality of conveyors, wherein conveying path extends through the first section 551 and the second section 552. As shown in FIG. 5, the first section 551 is arranged along at least a first part of the conveying path between the first position 541 and the transition 542 to the second section 552. The apparatus 50 further comprises a second position 543 along the conveying path which second position 543 is configured to remove dough from a conveyor 527 of the plurality of conveyors, and out of the apparatus 50. The second section 552 is arranged along at least at a second part of the conveying path between the transition 542 from the first section and the second position 543.

As schematically shown in FIG. 5, adjacent to the first position 541 of the apparatus 50, an input conveyor 561 is provided, which is configured for delivering dough pieces to the first position 541 into the apparatus 50. The dough pieces can be delivered directly on the surface of the conveyor 521, or can be delivered on top of dough trays as schematically shown in the example in FIGS. 2 and 3.

Adjacent to the second position 543 of the apparatus 50, an output conveyor 562 is provided, which is configured for receiving dough pieces from the second position 543 and out of the apparatus 50.

As schematically shown in FIG. 5, the apparatus 50 may be provided with one or more optional input conveyors 563, 564, 565, which can be used to introduce dough pieces at different points along the conveying path in the apparatus 50.

The first section 551 is configured to supply heat over the conveyors 521, 522 inside the first section 511, preferably via a supply of process air. Accordingly, the apparatus 50 comprises an air supply which covers at least part of the first section 551 and which is arranged to blow process air into the first section 551, in a substantial horizontal direction over and in between the conveyors 521, 522, in particular in a direction substantially perpendicular to the plane of FIG. 5. Preferably, the apparatus 50 comprises air supplies (not shown in detail) at opposite longitudinal sides of conveyors 521, 522 in the first section 551 in order substantially symmetrically supply the process air to the dough on conveyors 521, 522 in the first section 551. Preferably, the air suppliers are configured to provide the process air to the dough in the first section 551 at an air speed of the process air in a range of 0.5-3.0 meters per second, preferably in a range of 1.0-2.5 meters per second.

In the example as shown in FIG. 5, the apparatus 50 comprises a single housing or chamber 51, which comprises both the first section 551 and the second section 552. The second section 552 of the chamber 51, is configured to provide process air at a low speed into said second section. Preferably, the apparatus 50 is configured to provide the process air into the second section 552 at an air speed of the process air in a range of 0-0.2 meters per second. At this part of the proofing apparatus 50 less or no energy needs to be provided to the dough, and the energy provided by the low speed process air is mainly used to compensate for energy losses through the walls and floor of the chamber, and for energy losses through the transport openings.

Figure 6:
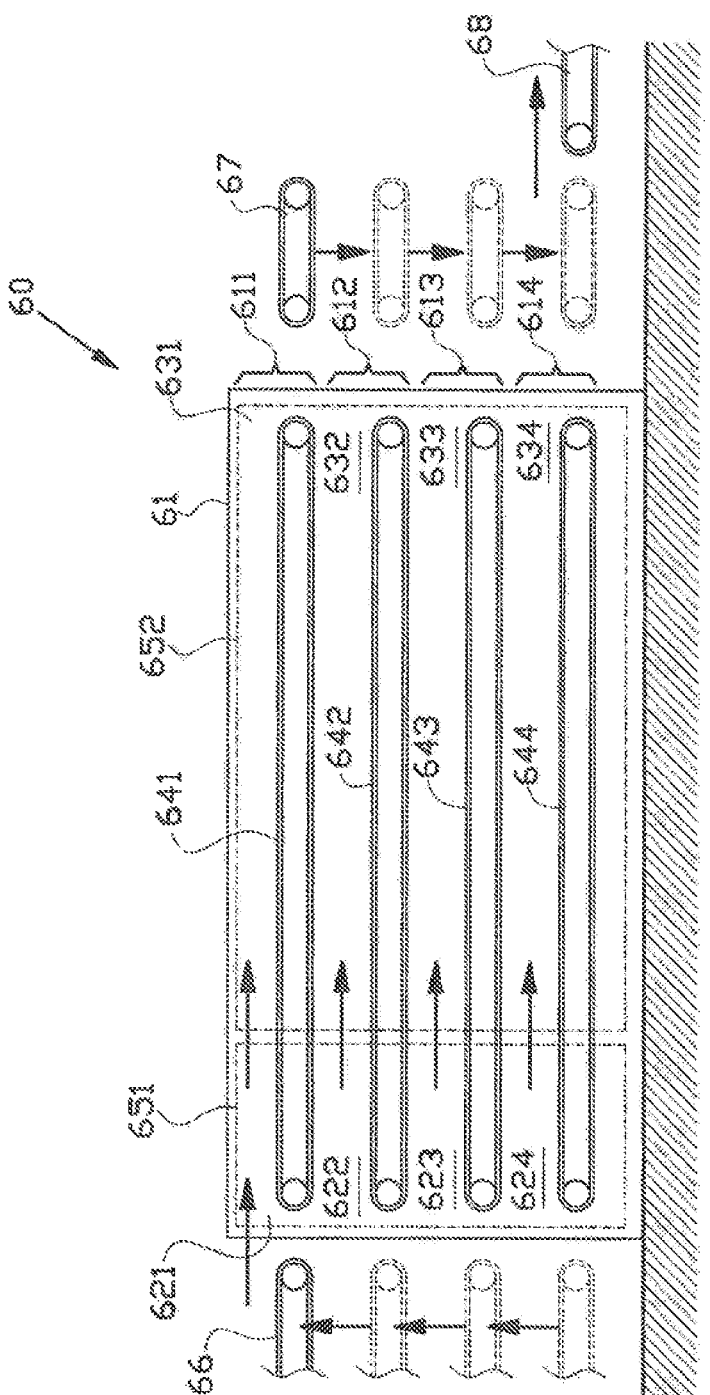

FIG. 6 schematically shows a fifth example of an apparatus 60 according to the invention. In this example, the apparatus 60 comprises a chamber 61 with a number of storeys 611, 612, 613, 614 situated above one another. Each storey 611, 612, 613, 614 is configured for placing a number of carriers for dough therein, wherein each storey is provided with an input end 621, 622, 623, 624 for passing the carriers into the storey 611, 612, 613, 614, and with an output end 631, 632, 633, 634 for passing the carriers out of the storey 611, 612, 613, 614. In addition, each storey comprises a guidance or transport device 641, 642, 643, 644 for guiding or transporting the carriers from the input end 621, 622, 623, 624 to the output end 631, 632, 633, 634, wherein the guidance device or transport device 641, 642, 643, 644 comprises a supporting member for supporting the carriers.

Outside the chamber 61, adjacent to the input end 621, 622, 623, 624 of the storeys 611, 612, 613, 614, a first lifting device 66 is placed. The first lifting device 66 can be moved up and down to alight with one of the storeys 611, 612, 613, 614. At least the first lifting device 66 is provided with an actuating device (in this example a belt conveyor) for moving a carrier placed on the first lifting device 66 into one of the storeys 611.

In addition, outside the chamber 61, adjacent to the output end 631, 632, 633, 634 of the storeys 611, 612, 613, 614, a second lifting device 67 is placed. The second lifting device 67 can also be moved up and down to alight with one of the storeys 611, 612, 613, 614, in order to receive a carrier from the output side 631 of one of the storeys 611.

As schematically shown in FIG. 6 and according to the present invention, each storey 611, 612, 613, 614 extends through a first section 651 and the second section 652, wherein the first section 651 is arranged along at least at a first part of each storey 611, 612, 613, 614 between the input end 621, 622, 623, 624 and the second section 652. The second section 652 is arranged along at least at a second part of each storey 611, 612, 613, 614 between the first section 651 and the output end 631, 632, 633, 634.

The first section 651 is configured to supply heat over a first part of the guidance or transport device 641, 642, 643, 644 inside the first section 611, preferably via a supply of process air (not shown in detail). Accordingly, the apparatus 60 comprises an air supply which covers at least part of the first section 651 and which is arranged to blow process air into the first section 651, in a substantial horizontal direction over and in between the a first part of the guidance or transport device 641, 642, 643, 644 inside the first section 651, in particular in a direction substantially perpendicular to the plane of FIG. 6. Preferably, the apparatus 60 comprises air supplies (not shown in detail) at opposite longitudinal sides of the guidance or transport device 641, 642, 643, 644 inside the first section 651, in order substantially symmetrically supply the process air to the dough in the first section 651. Preferably, the air suppliers are configured to provide the process air to the dough in the first section 651 at an air speed of the process air in a range of 0.5-3.0 meters per second, preferably in a range of 1.0-2.5 meters per second.

In the example as shown in FIG. 6, the apparatus 60 comprises a single housing or chamber 61, which comprises both the first section 651 and the second section 652. The second section 652 of the chamber 61, is configured to provide process air at a low speed into said second section. Preferably, the apparatus 60 is configured to provide the process air into the second section 652 at an air speed of the process air in a range of 0-0.2 meters per second. At this part of the proofing apparatus 60, less or no energy needs to be provided to the dough, and the energy provided by the low speed process air is mainly used to compensate for energy losses through the walls and floor of the chamber, and for energy losses through the transport openings.

Figure 7:
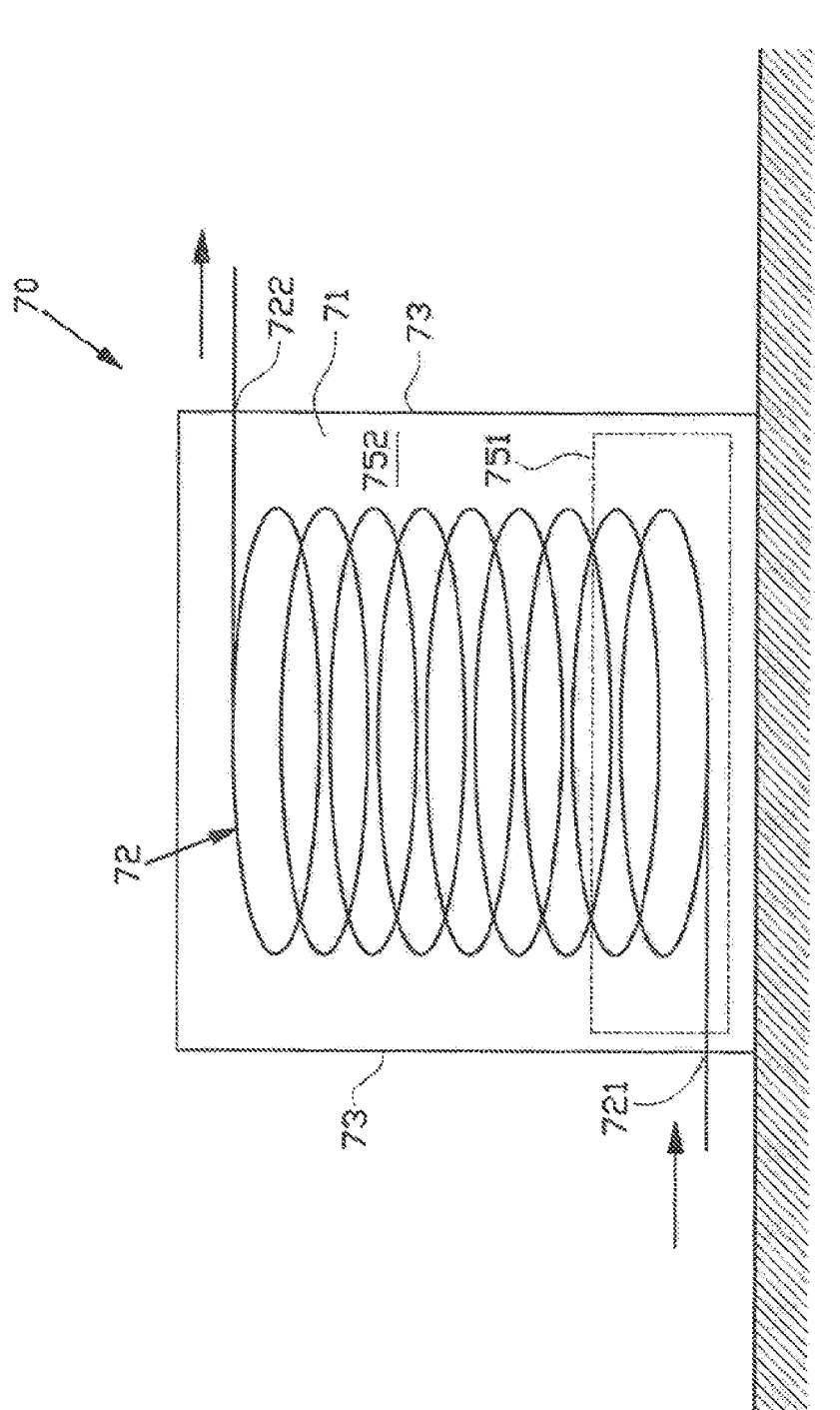

FIG. 7 schematically shows a sixth example of an apparatus 70 according to the invention. In this example, the apparatus 70 comprises a chamber 71 with a helical conveyor 72 comprising a frame for supporting a helical path having a first number of windings or storeys placed above one another. The helical path extends between an input end 721 and an output end 722. The helical conveyor 72 as such is known in the art and comprises a modular conveyor belt sitting on the helical path and able to slide over it, and a drive mechanism engaging the modular conveyor belt for driving the modular conveyor belt to move along the helical path.

According to the present invention, the helical path extends through the first section 751 and the second section 752, wherein the first section 751 is arranged along at least at a first part of the helical path between the input end 721 and the second section 752. The second section 752 is arranged along at least at a second part of the helical path between the first section 751 and the output end 722.

The first section 751 is configured to supply heat over a first part of the helical conveyor 72 inside the first section 751, preferably via a supply of process air (not shown in detail). Accordingly, the apparatus 70 comprises an air supply which covers at least part of the first section 751 and which is arranged to blow process air into the first section 751, in a substantial horizontal direction over and in between the modular conveyor belt sitting on the helical path inside the first section 751, in particular in a direction substantially radial to the helical conveyor 72. Preferably, the apparatus 60 comprises air supplies (not shown in detail) at opposite radial sides of the helical conveyor 72 inside the first section 751, in order substantially symmetrically supply the process air to the dough in the first section 751. Preferably, the air suppliers are configured to provide the process air to the dough in the first section 751 at an air speed of the process air in a range of 0.5-3.0 meters per second, preferably in a range of 1.0-2.5 meters per second.

In the example as shown in FIG. 7, the apparatus 70 comprises a single housing or chamber 71, which comprises both the first section 751 and the second section 752. The second section 752 of the chamber 71 is configured to provide process air at a low speed into said second section. Preferably, the apparatus 70 is configured to provide the process air into the second section 752 at an air speed of the process air in a range of 0-0.2 meters per second. At this part of the proofing apparatus 70, less or no energy needs to be provided to the dough, and the energy provided by the low speed process air is mainly used to compensate for energy losses through the walls and floor of the chamber, and for energy losses through the transport openings. Preferably, the process air in the second section 752 is substantially vertically directed along the circumferential outer walls 73 of the chamber 71.

Figure 8:
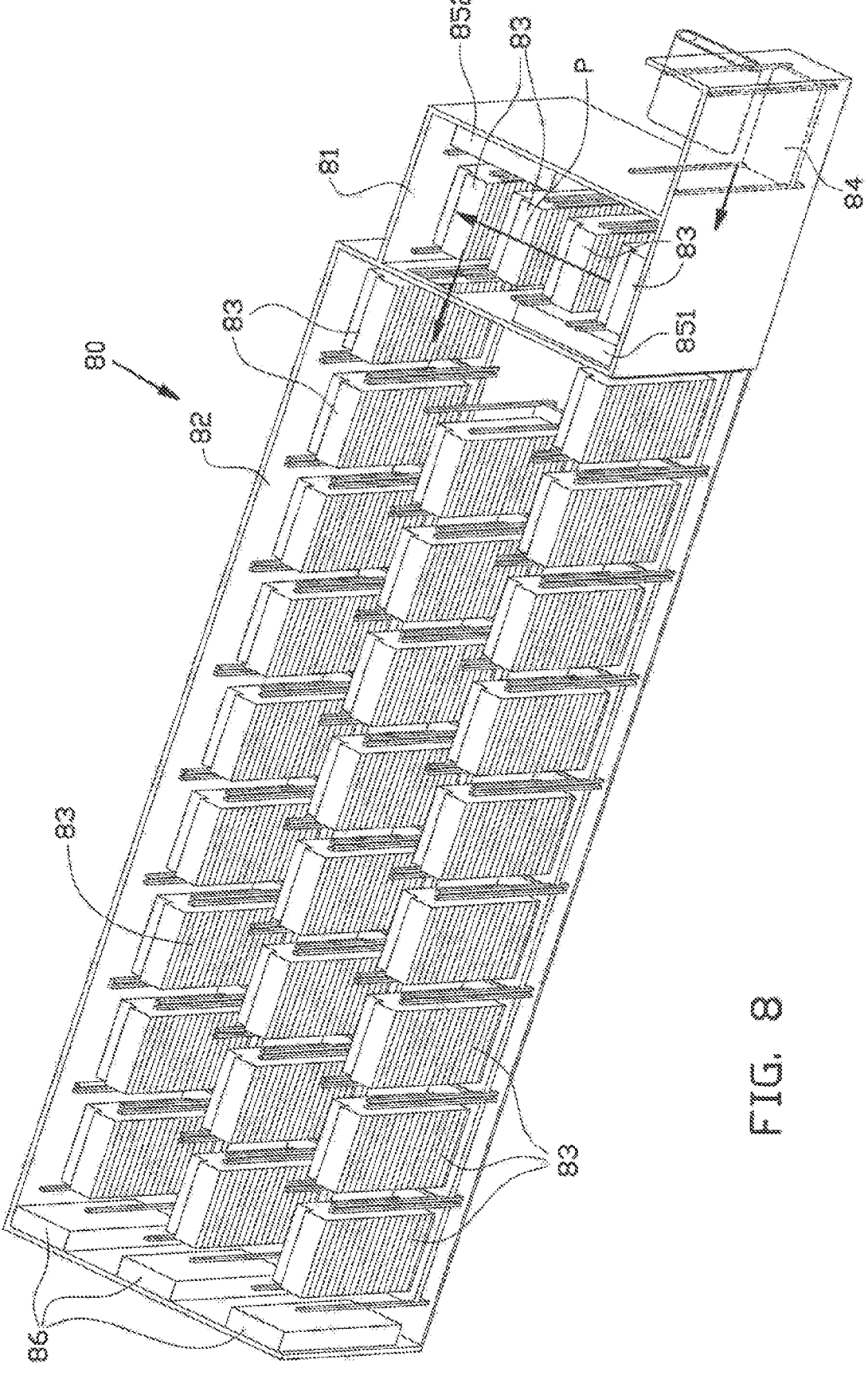
Figure 6:
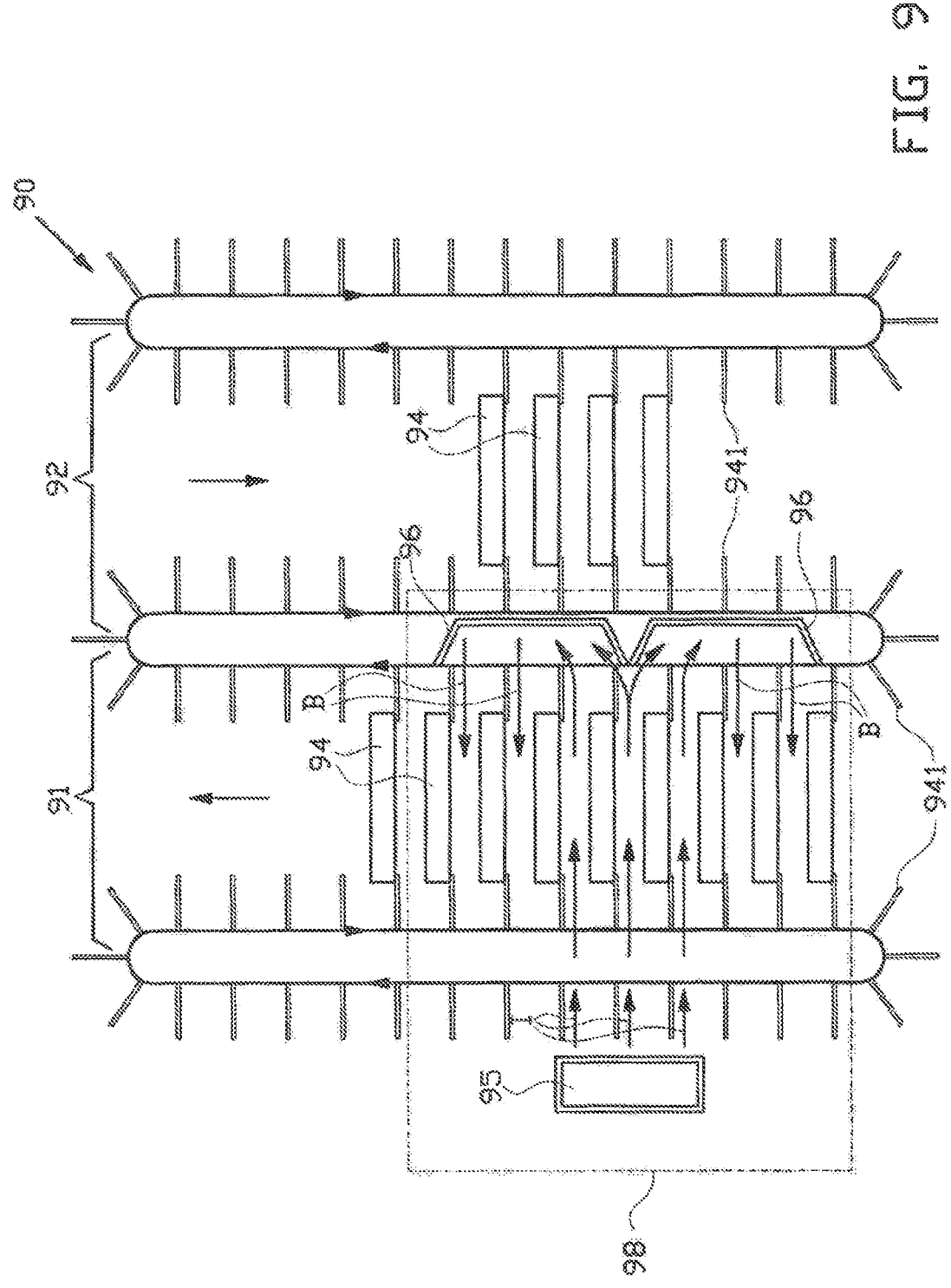

FIG. 8 schematically shows a seventh example of an apparatus 80 according to the invention. In this example, the apparatus 80 comprises a first chamber 81 comprising the first section, and a separate second chamber 82 comprising the second section, and a transport device for moving racks 83 for the dough from the first chamber 81 to the second chamber 82. The transport device comprises for example an electrically driven platform 84 which is configured for receiving a rack of carriers with dough pieces, and which is configure to move the rack into the first chamber 81, from the first chamber to a predefined position in the second chamber 82, and from said predefined position in the second chamber 82 to an exit port of the apparatus 80.

As schematically shown in FIG. 8, the apparatus 80 comprises multiple separate carriages 83 for holding dough, wherein the first chamber 81 is configured to hold X carriages 83 of said multiple separate carriages (in the example of FIG. 8: X=4), wherein the second chamber 82 is configured to hold 4*X or more carriages 83 of said multiple separate carriages (in the example of FIG. 8, the second chamber 82 is configure to hold a maximum of 26 carriages).

The first chamber 81 is configured to supply heat to the carriages 83 inside the first chamber 81, preferably via suppliers 851, 852 of process air. Accordingly, the apparatus 80 comprises a first air supply 851 which covers at least a first part of the chamber 81 and which is arranged to blow process air into the carriages 83 adjacent to the first air supply 851, in a substantial first horizontal direction. In addition, the apparatus 80 comprises a second air supply 852 which covers at least a second part of the chamber 81 and which is arranged to blow process air into the carriages 83 adjacent to the second air supply 852, in a substantial second horizontal direction, wherein the second horizontal direction is substantially opposite to the first horizontal direction.

Since the first air supply 851 and the second air supply 852 are arranged at opposite sides of a path P along which the carriages 83 are moved through the first camber 81, a substantially symmetrically supply of the process air to the dough has been provided when the carriages have traversed the first chamber 81. Preferably, the air suppliers 851, 852 are configured to provide the process air to the dough in the first section 751 at an air speed of the process air in a range of 0.5-3.0 meters per second, preferably in a range of 1.0-2.5 meters per second.

In the example as shown in FIG. 8, the apparatus 80 comprises a separate second chamber 82, which comprises the second section. The second chamber 82 is configured to provide process air at a low speed, which not directed towards the carriages 83 inside the second chamber 82. Preferably, the apparatus 80 comprises air suppliers 86 to provide the process air into the second chamber 82 at an air speed of the process air in a range of 0-0.2 meters per second. At this part of the proofing apparatus 80, less or no energy needs to be provided to the dough, and the energy provided by the low speed process air is mainly used to compensate for energy losses through the walls and floor of the chamber, and for energy losses through the transport openings.

FIG. 9 schematically shows an example of an accessory kit for modifying a proofing apparatus 90 into a device according to the invention. In this example, the apparatus 90 comprises at least two adjacently positioned lift units 91, 92. A first lift unit 91 is configured for intermittent upward conveyance of holders 94 for dough pieces and a second lift unit 92 is configured for intermittent downward conveyance of the holders 94 for dough pieces. In addition, a transfer device (not shown) is configured for at the upper side of the lift units 91, 92 transferring the holders 94 for dough pieces from the first lift unit 91 to the second lift unit 92. Preferably, each lift compartment is provided with pairs of elongated supporting elements 941 that are placed above one another, wherein the supporting elements 941 of each pair are situated horizontally spaced apart from each other for supporting a product holder 94. The holders 94 with pieces of dough are supplied into the apparatus 90 at the bottom side of the first lift unit 91. Subsequently the holders 94 are picked up by the supporting elements 941 and moved upward. At the upper side of the first lift unit 91, the holders 94 are transferred from the supporting elements of the first lift unit 91 onto the supporting elements of the second lift unit 92 by the transfer device (not shown). Subsequently the holders 94 are moved downward until they reach the bottom of the second lift unit 92 where they are removed out of the apparatus 90. Such an apparatus is known in the art.

In order to modifying a proofing apparatus 90 into a device according to the invention, an accessory kit is provided, which accessory kit comprises an air supply 95 and air deflectors 96. As shown in FIG. 9, the accessory kit is arranged at the bottom part of the first lift unit 91 to provide a first section 98. The air supply 95 is configured to provide process air at a high speed in a first horizontal direction to the dough pieces on the holders 94 in the first section 98. At a side of the first lifting device 91 opposite to the position of the air supply 95, one or more air deflectors 96 are arranged to redirect the process air back into the first lifting device. The air deflectors 96 confine the high-speed air in the first section 98 of the apparatus 90, and in addition provide a symmetric heating to the dough pieces on the holders 94, as explained below:

The air supply 95 is configure to provide an inflow I high speed process air at a high temperature into the first lifting device 91. When the warm process air from the air supply 95 moves (in FIG. 9 from left to right) over the dough pieces, it cools down a little. After the process air has traversed the first lifting device 91, it is redirected by the air deflectors 96 to provide a back flow B below and above the inflow. When the back flow moves (in FIG. 9 from right to left) over de dough pieces it cools down further. Accordingly, the dough pieces on the side of the air supply 95 receive the coldest back flow, the hottest inflow I and again the coldest back flow. The dough pieces on the side of the air deflectors 96 receive the hottest back flow, the coldest inflow and again the hottest back flow, wherein the hottest backflow is substantially equal to the coldest inflow. The air supply 95 can now be configured to provide the process air with a desired temperature and speed, in relation to, inter alia, the temperature of the dough, the amount of dough and the speed of conveyance of the holders 94, so that all pieces of dough receive a substantial same amount of heat during their traverse of the first section 98.

Accordingly, the accessory kit 95, 96 can be used to modify a state of the art proofing device, and to provide a first section 98 according to the invention in the proofing device. The remaining part of the proofing device then acts as a second section, in the same way as in the first example as described above with reference to FIG. 2.

It is noted that, in use, the dew point inside the apparatus 90, and in particular inside the first section 98 in the first lifting device 91, is set above a temperature of the dough, in particular the surface of the dough that enters the first lifting device 91.

It is to be understood that the above description is included to illustrate the operation of the preferred embodiments and is not meant to limit the scope of the invention. From the above discussion, many variations will be apparent to one skilled in the art that would yet be encompassed by the scope of the present invention.

The invention claimed is:

1. A method for the final proofing of dough in a proofing device, the method comprising the following steps:
   providing the proofing device that includes a proofing chamber;
   setting a dew point inside the proofing chamber above a temperature of the surface of the dough;
   providing the dough to the proofing chamber;
   subjecting the dough inside the proofing chamber to an active stage, wherein during the active stage process air is applied directly surrounding the dough; and
   subjecting the dough inside the proofing chamber to a resting stage subsequent to the active stage,
   wherein an air speed of the process air directly surrounding the dough in the active stage is higher than in the resting stage.

2. The method according to claim 1, wherein the air speed of process air which is provided to the dough in the proofing device during the active stage, is in a range of 0.5-3.0 meters per second.

3. The method according to claim 1,
   wherein a transition from the active stage to the resting stage is initiated when the temperature of the surface of the dough is substantially equal to the dew point inside the proofing device, or
   wherein a transition from the active stage to the resting stage is initiated after the dough has been in the active stage during a time period which is prescribed by the dough recipe.

4. The method according to claim 1, wherein the active stage is provided during an active time period,
   wherein the resting stage is provided during a passive time period,
   wherein a ratio between the active time period and the passive time period is in a ranged from 1:4 to 1:10.

5. The method according to claim 1, wherein during the active stage heat is supplied to the dough.

6. The method according to claim 1, wherein in the active stage the process air is provided to the dough, and in the resting stage the process air is directed along or around the dough.

7. The method according to claim 1, wherein the process air in the active stage has a temperature below 45 degrees Celsius.

8. The method according to claim 1, wherein the dough is arranged at a stationary position inside the proofing chamber during the active stage and the resting stage.

9. A method for the final proofing of dough in a proofing device, the method comprising the following steps:
   providing the proofing device, wherein the proofing device comprises a first section and a second section;
   setting a dew point inside the first section of the proofing device above a temperature of the surface of the dough;
   providing the dough to the first section of the proofing device;
   subjecting the dough in the first section to an active stage, wherein during the active stage process air is applied directly surrounding the dough;
   transporting the dough from the first section to the second section; and
   subjecting the dough in the second section to a resting stage, wherein an air speed of the process air directly surrounding the dough in the active stage is higher than in the resting stage.

10. The method according to claim 9, wherein the first section and the second section are arranged in a single chamber of the proofing device.

11. The method according to claim 9, wherein the proofing device comprises a first chamber and a separate second chamber, wherein the first chamber comprises the first section and the second chamber comprises the second section.

12. The method according to claim 9,
    wherein the air speed of process air which is provided to the dough in the first section during the active stage is in a range of 0.5-3.0 meters per second.

13. The method according to claim 9, wherein the step of transporting the dough from the first section to the second section is performed:
    before or when the temperature of the surface of the dough in the first section is equal or smaller than the dew point in the first section,
    after a predetermined period after the temperature of the surface of the dough is equal or higher than the dew point in the first section, or
    when the dough has been in the first section during an active time period.

14. The method according to claim 9, wherein the dough is kept in the first section during an active time period, and wherein the dough is kept in the second section during an active time period, wherein a ratio between the active time period and the passive time period is in a range from 1:4 to 1:10.

15. The method according to claim 9, wherein during the active stage heat is supplied to the dough.

16. The method according to claim 9, wherein in the active stage the process air is provided to the dough, and in the resting stage the process air is directed along or around the dough.

17. The method according to claim 9, wherein the process air in the active stage has a temperature below 45 degrees Celsius.

18. The method according to claim 9, wherein the proofing device comprises a transport device for moving the dough from the first section to the second section.

19. The method according to claim 1, wherein the air speed of process air which is provided into the proofing device during the resting stage is in a range of 0-0.2 meters per second.

20. The method according to claim 9, wherein the air speed of process air which is provided into the second section during the resting stage is in a range of 0-0.2 meters per second.

* * * * *